(12) United States Patent
Kim et al.

(10) Patent No.: US 9,455,062 B2
(45) Date of Patent: Sep. 27, 2016

(54) INSULATION COATING COMPOSITION FOR NON-ORIENTED ELECTRICAL SHEET, METHOD FOR MANUFACTURING THE SAME, AND NON-ORIENTED ELECTRICAL SHEET TO WHICH INSULATION COATING COMPOSITION IS APPLIED

(71) Applicant: POSCO, Gyeongsangbuk-do (KR)

(72) Inventors: Jung-Woo Kim, Gyeongsangbuk-do (KR); Min Serk Kwon, Gyeongsangbuk-do (KR); Heon-Jo Choi, Gyeongsangbuk-do (KR)

(73) Assignee: POSCO, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 14/369,248

(22) PCT Filed: Nov. 15, 2012

(86) PCT No.: PCT/KR2012/009662
§ 371 (c)(1),
(2) Date: Jun. 27, 2014

(87) PCT Pub. No.: WO2013/100354
PCT Pub. Date: Jul. 4, 2013

(65) Prior Publication Data
US 2015/0017428 A1  Jan. 15, 2015

(30) Foreign Application Priority Data
Dec. 28, 2011  (KR) ........................ 10-2011-0145306

(51) Int. Cl.
| | |
|---|---|
| *A61K 9/14* | (2006.01) |
| *H01B 3/00* | (2006.01) |
| *H01B 3/40* | (2006.01) |
| *C08K 3/00* | (2006.01) |
| *C08K 3/32* | (2006.01) |
| *C08K 3/36* | (2006.01) |
| *C09D 163/00* | (2006.01) |

(52) U.S. Cl.
CPC .................. *H01B 3/002* (2013.01); *C08K 3/00* (2013.01); *C08K 3/32* (2013.01); *C08K 3/36* (2013.01); *C09D 163/00* (2013.01); *H01B 3/40* (2013.01); *C08K 2003/327* (2013.01); *C08K 2003/328* (2013.01); *Y10T 428/259* (2015.01); *Y10T 428/31529* (2015.04)

(58) Field of Classification Search
None
See application file for complete search history.

(56) References Cited

U.S. PATENT DOCUMENTS

| | | | |
|---|---|---|---|
| 2009/0324837 A1* | 12/2009 | Han ...................... | C09D 5/084 427/386 |
| 2011/0100081 A1* | 5/2011 | Rau ...................... | C10M 111/04 72/42 |

FOREIGN PATENT DOCUMENTS

| | | |
|---|---|---|
| CN | 101517015 | 8/2009 |
| CN | 102119239 | 7/2011 |
| EP | 2 444 523 A1 | 4/2012 |
| JP | 10-046350 | 2/1998 |
| JP | 2000-169973 | 6/2000 |
| JP | 2005-200705 | 7/2005 |
| JP | 2009-545674 | 12/2009 |
| JP | 2010-500266 | 1/2010 |
| KR | 10-0762466 | 10/2007 |
| KR | 2010007541 A * | 1/2010 |
| KR | 10-2011-0072848 | 6/2011 |

OTHER PUBLICATIONS

International Search Report from the Korean Intellectual Property Office for International Application No. PCT/KR2012/009662 mailed Mar. 15, 2013.

* cited by examiner

*Primary Examiner* — Susan Tran
(74) *Attorney, Agent, or Firm* — Finnegan, Henderson, Farabow, Garrett & Dunner, L.L.P.

(57) ABSTRACT

Disclosed is an insulating film composition of a non-oriented electrical steel sheet. The insulating film composition of a non-oriented electrical steel sheet according to the present invention comprises a mixed metal phosphate consisting of aluminum phosphate ($Al(H_3PO_4)_{x=1-3}$) and cobalt phosphate ($Co(H_3PO_4)_3$), and an organic/inorganic composite consisting of epoxy resin and silica ($SiO_2$) nanoparticle substituted on the functional group of the epoxy resin.

27 Claims, 6 Drawing Sheets

1) $FeO + 2H_3PO_4 \xrightarrow{Na^+} Fe(H_2PO_4)_2 + H_2O$

2) $Fe_2O_3 + 6H_3PO_4 \xrightarrow{Na^+} 2Fe(H_2PO_4)_3 + 3H_2O$

INSULATION COATING COMPOSITION FOR NON-ORIENTED ELECTRICAL SHEET, METHOD FOR MANUFACTURING THE SAME, AND NON-ORIENTED ELECTRICAL SHEET TO WHICH INSULATION COATING COMPOSITION IS APPLIED

CROSS REFERENCE TO RELATED APPLICATIONS

This application is a national phase application based on PCT/KR2012/009662, filed Nov. 15, 2012, which claims the priority of Korean Patent Application No. 10-2011-0145306, filed Dec. 28, 2011, the contents of both of which are incorporated herein by reference.

TECHNICAL FIELD

The present invention relates to a non-oriented electrical steel sheet, and more particularly, to a non-oriented electrical steel sheet that an insulating film composition having an excellent insulating property is formed.

BACKGROUND ART

A non-oriented electrical steel sheet is a steel sheet which a magnetic property thereof is uniform in all directions on a rolling plate, and is widely used in a motor, iron core of electric generator, electric motor, small transformer, and the like, and is used in demanding markets of driving motor, home appliances and large motor separately in two types such as one that a stress-relieving annealing (SRA) for improving the magnetic property after punching working should be practiced and the other that the SRA is omitted if cost loss is larger than the effect of magnetic property by the SRA.

A forming of the insulating film is a procedure which belongs to a finishing process for manufacturing a product, and requires a stickiness resistance that steel sheets of iron cores are not adhered to each other after the SRA which recovers the magnetic property by relieving the processing stress of the steel sheet and the continuous punching workability inhibiting abrasion of a mold, and a surface adherence, and the like, upon preparing iron cores by laminating many materials after the punching working in a predetermined shape, in addition to electrical properties inhibiting an occurrence of eddy current. In addition to said basic characteristics, an excellent application workability of coating solution, solution stability usable for a long period after the combination, and the like, are also required.

Meanwhile, a main purpose of a non-oriented insulating film resides in an inter-layer insulation between iron sheets to be laminated. However, as the use of small electric motor is increased, a film performance advantageous to a workability, weldabilty and corrosion resistance, as well as an insulating property is evaluated as a major physical property, and recently an electrical steel sheet having excellent surface quality is required as the surface quality of the steel sheet also has an effect on the use characteristics.

Also, the non-oriented electrical steel sheet is currently riding a wave of high-end by the development of high efficiency motor to keep pace with government's low-carbon policy and as it proceeds to the high-end, the surface of electrical sheet requires high functionability (high insulating property, high heat resistance, high corrosion resistance).

In particular, an excellent insulating property between the layers of non-oriented electrical steel sheets, which the performance of motor can be maximized by minimizing Eddy Current Loss, is an essential item.

In order to secure an excellent insulating property for the non-oriented electrical steel sheet, the method of increasing a coating thickness thereof is the most common method. However, if the coating thickness is increased, there is a disadvantage that the properties such as wettability, heat resistance, adherence before/after SRA and Stacking Factor, and the like, are deteriorated.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention is derived in order to solve above-mentioned problem, and an object of the present invention is to provide a non-oriented electrical steel sheet having excellent insulating property before/after SRA more than existing thin-film products by a nanoparticle size, injection amount and uniform distribution of nanoparticles in the coating layer despite that an insulating coating solution is applied on the non-oriented electrical steel sheets in a thickness of thin-film, in which the insulating coating solution is prepared by mixing $SiO_2$ nanoparticle with an acid-type of organic/inorganic composite modified by a chemical reaction, in a basic composition of a mixed metal phosphate of aluminum phosphate and cobalt phosphate, sodium perborate ($NaBO_3 \cdot 4H_2O$) as an oxidizing promoter and, an epoxy-based emulsion resin.

Technical Solution

In order to achieve the purpose, the composition of the insulating film of the non-oriented electrical steel sheet according to an exemplary embodiment of the present invention includes a mixed metal phosphate consisting of aluminum phosphate ($Al(H_3PO_4)_{x=1-3}$) and cobalt phosphate ($Co(H_3PO_4)_3$), and an organic/inorganic composite consisting of epoxy resin and silica ($SiO_2$) nanoparticle substituted on the functional group of the epoxy resin.

The insulating film composition may include 30 to 70 wt % of the mixed metal phosphate, and 30 to 70 wt % of the organic/inorganic composite.

The insulating film composition can further comprise an oxidizing promoter; and 0.1 to 1.0 wt % of the oxidizing promoter in the insulating film composition.

The size of silica nanoparticle may be 5 to 50 nm.

The mixing ratio (aluminum phosphate/cobalt phosphate) of the aluminum phosphate and cobalt phosphate mixed in said mixing metal phosphate may be 0.05 to 0.2.

The solid content of said organic/inorganic composite material (composite) may be 30 to 70 wt %, and the ratio of silica ($SiO_2$)/resin in the solid may be 0.3 to 0.6.

The oxidizing promoter may be sodium perborate ($NaBO_3 \cdot 4H_2O$).

A method for manufacturing an insulating film composition of a non-oriented electrical steel sheet according to an exemplary embodiment of the present invention includes: the step of providing 30 to 70 wt % of a mixed metal phosphate consisting of aluminum phosphate and cobalt phosphate; the step of providing 30 to 70 wt % of an organic/inorganic composite consisting of epoxy resin and silica nanoparticle substituted on the functional group of the epoxy resin; and the step of mixing and then stirring the mixed metal phosphate and the organic/inorganic composite.

0.1 to 1.0 wt % of oxidizing promoter can be added to the mixture of the mixed metal phosphate and the organic/inorganic composite.

The aluminum phosphate can be prepared by adding 5 to 40 g of aluminum hydroxide ($Al(OH)_3$) based on 100 g of aqueous solution consisting of 15 wt % water ($H_2O$) and 85 wt % phosphoric acid ($H_3PO_4$) and reacting them at the temperature range of 80 to 90° C. for 6 to 10 hrs.

Upon preparing the aluminum phosphate, aluminum and phosphorous may form a single bond (Al—P), a double bond (Al═P) and a triple bond (Al≡P) by a chemical bond between aluminum hydroxide and phosphoric acid, in which the amount of free phosphoric acid ($H_3PO_4$) may be less than 40%.

The cobalt phosphate may be prepared by adding 2 to 5 g of cobalt hydroxide ($Co\ OH)_2$ based on 100 g of aqueous solution consisting of 15 wt % water ($H_2O$) and 85 wt % of phosphoric acid ($H_3PO_4$) and reacting them at the temperature range of 80 to 90° C. for 6 to 10 hrs.

The mixing ratio of the aluminum phosphate and cobalt phosphate (aluminum phosphate/cobalt phosphate) may be 0.05 to 0.2.

The solid content of the organic inorganic composite may be 30 to 70 wt %, and the ratio of silica ($SiO_2$)/resin in the solid may be 0.3 to 0.6.

The organic/inorganic composite may be modified a silica ($SiO_2$) particle having the size of 10 to 50 nm to the acid-based epoxy resin.

A non-oriented electrical steel sheet that an insulating coating layer is formed by another exemplary embodiment of the present invention, wherein the insulating coating layer is formed by applying an insulating film composition comprises a mixed metal phosphate consisting of aluminum phosphate (Al $(H_3PO_4)_{x=1-3}$) and cobalt phosphate (Co $(H_3PO_4)_3$), and an organic/inorganic composite consisting of epoxy resin and silica ($SiO_2$) nanoparticle substituted on the functional group of the epoxy resin to a surface of the electrical steel sheet, and then drying the insulation film composition.

The insulating film composition may include 30 to 70 wt % of the mixed metal phosphate, and 30 to 70 wt % of the organic/inorganic composite The insulating film composition can further comprise an oxidizing promoter; and, 0.1 to 1.0 wt % of the oxidizing promoter in the insulating film composition. The size of the silica nanoparticle in the non-oriented electrical steel sheet may be 5 to 50 nm.

In the insulating film composition of the non-oriented electrical steel sheet, the mixing ratio of the aluminum phosphate and cobalt phosphate (aluminum phosphate/cobalt phosphate) mixed in the mixed metal phosphate may be 0.05 to 0.2. The solid content of the organic/inorganic composite is 30 to 70 wt %, and the ratio of silica ($SiO_2$)/resin in the solid may be 0.3 to 0.6.

In the insulating film composition of the non-oriented electrical steel sheet, the oxidizing promoter may be sodium perborate ($NaBO_3.4H_2O$).

The ratio of mineral in the insulating coating layer may be 0.55 to 0.95.

A distribution area of silica ($SiO_2$) distributed in the insulating coating layer may be 5 to 30%.

In the electrical steel sheet in which a coating layer is formed by the insulating film composition, the insulating resistance property may be 10.0 $\Omega cm^2$ or more at 1.0 μm or lower of the thickness of the coating layer.

After applying the insulating film composition, the loss of the coating layer may be less even after stress relieving annealing (SRA) process at the temperature range of 700 to 850° C., and 100% nitrogen ($N_2$) atmosphere, and the insulating resistance property at 1.0 μm or lower of the thickness of the coating layer may be 10.0 $\Omega cm^2$ or more.

In the electrical steel sheet that the coating layer is formed by the insulating film composition, the silica ($SiO_2$) particles in the coating layer are very uniformly distributed.

Advantageous Effects

According to the present invention, a non-oriented electrical steel sheet having an excellent insulating film can be provided by applying silica ($SiO_2$) nano composite to the preparation of the film composition for use in the non-oriented electrical steel sheet.

Moreover, the present invention can provide a non-oriented electrical steel sheet having excellent insulating property before/after stress relieving annealing by controlling the size and injecting amount of nanoparticle, and distributing uniformly a nanoparticle in a coating layer.

MODE FOR INVENTION

Advantages and characteristics of the present invention, and the method for achieving them will be clear in reference with the exemplary embodiments as described below in detail along with accompanying drawings. However, the present invention is not limited to the exemplary embodiments to be described below but can be embodied in various forms, provided that the present exemplary embodiments are presented so as to make the disclosure of the present invention complete and to fully inform those having ordinary knowledge in the art to which the present invention belongs of the scope of the invention, and the present invention is defined only by the scope of the claims.

Throughout the specification, same reference numerals designate the same constitutional elements.

Hereinafter, the insulating film composition of the non-oriented electrical steel sheet according to preferable exemplary embodiment of the present invention will be illustrated.

The insulating film composition of the non-oriented electrical steel sheet according to preferable exemplary embodiment of the present invention comprises a mixed metal phosphate consisting of aluminum phosphate (Al$(H_3PO_4)_{x=1-3}$) and cobalt phosphate (Co$(H_3PO_4)_3$), and an organic•inorganic composite consisting of epoxy resin and silica ($SiO_2$) nanoparticle substituted on the functional group of the epoxy resin.

The insulating film composition may comprise 30 to 70 wt % of the mixed metal phosphate consisting of aluminum phosphate (Al$(H_3PO_4)_{x=1-3}$) and cobalt phosphate (Co$(H_3PO_4)_3$), and 30 to 70 wt % of the organic•inorganic composite.

The insulating film composition can be further comprise an oxidizing promoter; and 0.1 to 1.0 wt % of the oxidizing promoter in the insulating film composition.

The organic•inorganic composite is characterized in that it comprises an epoxy resin and silica ($SiO_2$) nanoparticle substituted on the functional group of the epoxy resin, and the size of the silica nanoparticle in the non-oriented electrical steel sheet is 5 to 50 nm.

It is characterized in that the mixing ratio (aluminum phosphate/cobalt phosphate) of the aluminum phosphate and cobalt phosphate mixed in the mixed metal phosphate is 0.05 to 0.2.

It is characterized in that the solid content of the organic•inorganic composite material (composite) is 30 to 70 wt %, and the ratio of silica ($SiO_2$)/resin in the solid is 0.3 to 0.6.

It is characterized in that the organic/inorganic composite is that which the silica ($SiO_2$) particle having the size of 10 to 50 nm was modified to the acid-based epoxy resin.

It is characterized in that the oxidizing promoter is sodium perborate ($NaBO_3.4H_2O$).

Figure 1:
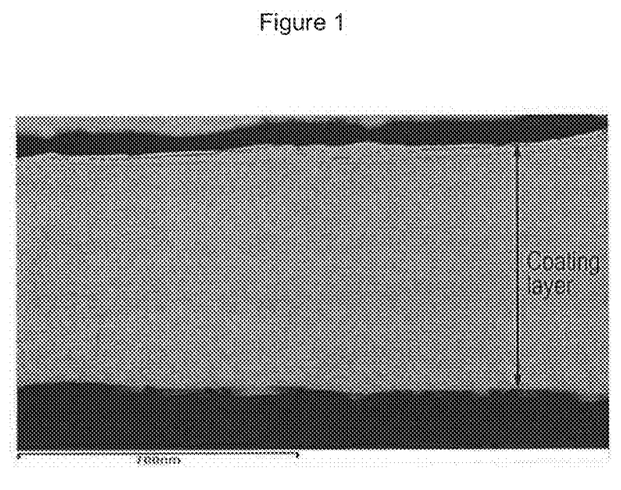
FIG. 1 is a process flow-chart of the insulating film of the non-oriented electrical steel sheet according to an exemplary embodiment of the present invention.

FIG. 1 is a process flow-chart of the manufacturing process of the insulating film composition according to the present invention.

A method for manufacturing the insulating film composition of a non-oriented electrical steel sheet according to an preferable another exemplary embodiment of the present invention comprises the step of providing 30 to 70 wt % of a mixed metal phosphate consisting of aluminum phosphate and cobalt phosphate; the step of providing 30 to 70 wt % of an organic/inorganic composite consisting of epoxy resin and silica nanoparticle substituted on the functional group of the epoxy resin; and the step of mixing and then stirring the mixed metal phosphate and the organic•inorganic composite.

If the insulating film composition according to the present invention is applied, the problem of the insulating property before/after the stress relieving annealing(SRA) of the steel sheet and the tacky problem caused by the introduction of phosphate to be solved.

At first, metal phosphate used in the present invention can be prepared by mixing a high concentration of aluminum phosphate (Al$(H_3PO_4)_{x=1-3}$) and cobalt phosphate (Co$(H_3PO_4)_3$).

The aluminum phosphate (Al$(H_3PO_4)_{x=1-3}$) can be prepared by adding 10 to 40 g of aluminum hydroxide (Al$(OH)_3$) based on 100 g of aqueous solution consisting of 15 wt % water ($H_2O$) and 85 wt % of free phosphoric acid ($H_3PO_4$) and reacting them at the temperature range of 80 to 90° C. for 6 to 10 hrs, and DeletedTextshe cobalt phosphate ((Co$(H_3PO_4)_3$) can be prepared by adding 2-5 g of cobalt hydroxide (Co$(OH)_2$) based on 100 g of aqueous solution consisting of 15 wt % water ($H_2O$) and 85 wt % of phosphoric acid ($H_3PO_4$) and reacting them at the temperature range of 80 to 90° C. for 6 to 10 hrs.

In general, after an hour upon coating the surface of the non-oriented electrical steel sheet with the insulating film composition comprising a large amount of metal phosphate, unreacted free phosphoric acid is precipitated, and thus the surface blooming phenomenon or tacky due to the free phosphoric acid would be occurred. Therefore, in order to reduce the surface defect due to the free phosphoric acid, the phosphoric acid and metal hydroxide should be prepared in an appropriate ratio and also the constitutional ratio of the phosphoric acid in the coating solution is very important.

More specifically, when the material surface and the phosphate are reacted at a certain temperature or higher, the phosphate not participated in the reaction is precipitated as the free phosphoric acid. In aluminum phosphate (Al$(H_3PO_4)_{x=1-3}$) if free phosphoric acid ($H_3PO_4$) is reacted with a high concentration of aluminum hydroxide (Al$(OH)_3$) at a high temperature, aluminum(Al) and phosphoric acid ($H_3PO_4$) form 20 to 70% of a single bond (Al—P), a double bond (Al=P) and a triple bond (Al≡P) depending on the injection amount of aluminum hydroxide (Al$(OH)_3$).

Figure 2:
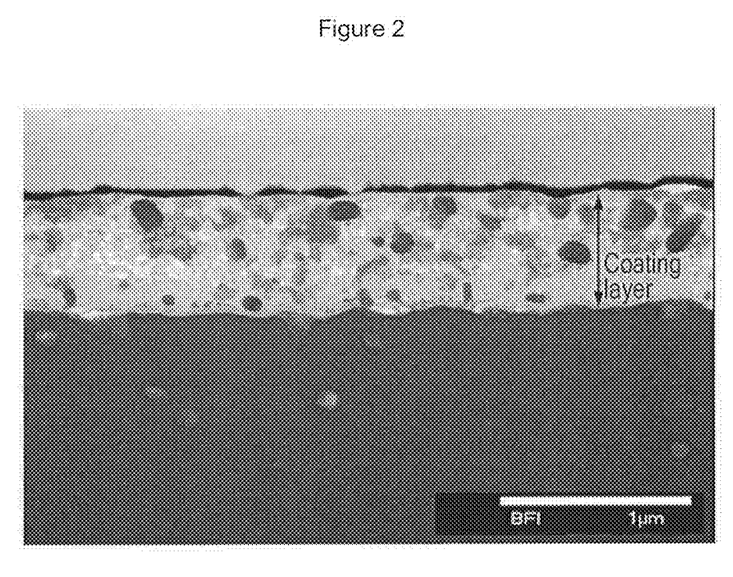
FIG. 2 is a drawing depicting single and multiple bonds between phosphate and aluminum phosphate in the mixed metal phosphate constituting the insulating film composition of the electrical steel sheet according to the present invention.

FIG. 2 is a drawing depicting various phosphate in the mixed metal phosphate.

For the reaction, the injection amount of aluminum hydroxide (Al$(OH)_3$) is controlled as 5 to 40 g based on 100 g of 15 wt % water ($H_2O$) and 85 wt % phosphoric acid ($H_3PO_4$). If the injection amount of aluminum hydroxide (Al$(OH)_3$) is 10 g or less, the surface tacky and blooming phenomenon are occurred due to high free phosphoric acid in the film composition, and if it is 40 g or more, the metal phosphate is recrystallized, and thus, the solution stability may be deteriorated.

Meanwhile, in the case of cobalt phosphate (Co$(H_3PO_4)_3$), if 2 to 5 g of cobalt hydroxide (Co$(OH)_2$) is injected into the free phosphoric acid ($H_3PO_4$) and then reacted at a high temperature, cobalt hydroxide (Co$(OH)_2$) is present in the form that cobalt hydroxide (Co$(OH)_2$) is dissolved in the fee phosphoric acid without any reaction with the free phosphoric acid.

Therefore, in order to improve the coating workability of the insulating film composition, the ratio of cobalt phosphate/aluminum phosphate was set to 0.05 to 0.2.

If the ratio of cobalt phosphate/aluminum phosphate is less than 0.05, the coating workability is deteriorated, and if the ratio of cobalt phosphate/aluminum phosphate is excess 0.2, the tacky and the blooming phenomenon of the surface can be occurred.

Also, if the amount of the injected cobalt hydroxide (Co$(OH)_2$) is injected as 2 g or less based on 100 g of 15 wt % water ($H_2O$) and 85 wt % of free phosphoric acid ($H_3PO_4$), an improvement in a wettability being the coating workability cannot be expected, and if it is injected in an amount of excess 5 g, cobalt hydroxide (Co$(OH)_2$) is not easily dissolved in the phosphoric acid and, the problem of stability deterioration that the metal phosphate is easily recrystallized would be occurred.

The mixed metal phosphate can improve the deterioration of close contacting property between the insulating film (coating layer) and the material (steel sheet) and, the tacky of the free phosphoric acid and precipitation phenomenon due to the introduction of phosphate, and also the insulating property before/after SRA.

Therefore, the mixing ratio of cobalt phosphate (Co($H_3PO_4$)$_3$)/aluminum phosphate (Al($H_3PO_4$)$_{x=1-3}$) is 0.05 to 0.2.

As the amount of substituted aluminum hydroxide (Al(OH)$_3$) is increased, since the amount of free phosphoric acid ($H_3PO_4$) in the aluminum phosphate (Al($H_3PO_4$)$_{x=1-3}$) can be minimized, the surface tacky and precipitation phenomenon caused by the free phosphoric acid can be solved.

Also, as the amount of substituted aluminum phosphate (Al($H_3PO_4$)$_{x=1-3}$) is increased, the compatibility with the organic/inorganic composite is improved, and thus, the ratio of the mixed metal phosphate in the coating composition can be increased. Accordingly, the insulating property becomes better due to high ratio of the mineral in the coating composition, also since there is no damage or crack phenomenon of the coating layer even after the SRA, the insulating property and heat resistance can be better.

Meanwhile, in the present invention, an organic/inorganic composite wherein nanoparticles are substituted to the resin which is not a form of conventional colloidal sol by a chemical reaction is applied to the insulating film composition to uniformly disperse the nanoparticles.

The organic/inorganic composite does not make any interparticle coagulation or precipitation phenomenon even though a large amount of nanoparticles are substituted to the functional group of the resin in the form of chemically substituted composite.

The average particle size of $SiO_2$ particle of the organic/inorganic composite modified by the chemical reaction is 5 to 50 nm, and in the organic/inorganic composite the solid content of $SiO_2$ nanoparticle is 10 to 50%. Wherein, if the average size of $SiO_2$ particle substituted on $SiO_2$ nano composite material (composite) is 5 nm or less, the entire surface area of the particle is increased, and thus, the insulating property is improved due to the maximization of barrier effect, but it has a drawback that the cost of the coating composition becomes expensive.

Meanwhile, if the average particle size is 50 nm or more, the entire surface area of $SiO_2$ is decreased to deteriorate the insulating property. Also, if the solid content of $SiO_2$ nanoparticle substituted on the epoxy-based resin is injected to 10% or less, the insulating property improvement by $SiO_2$ nanoparticle is not high, and if the solid is 50% or more, the problem deteriorating the punching property may be occurred by a high ratio of the mineral in the coating layer.

Meanwhile, it is characterized in that the ratio of the mineral consisting of mixed metal phosphate and silica ($SiO_2$) nanoparticle in the insulating film composition except for water is 0.55 to 0.95. If the mineral ratio is less than 0.55, the extent improving the insulation property is not high, and the problem that the close contacting property after SRA is deteriorated is occurred. Meanwhile, if the mineral ratio is excess 0.95, the problem that the corrosion resistance and punching property are deteriorated is occurred.

In the present invention, in order to impart an excellent insulating property to the surface of the non-oriented electrical steel sheet, the organic/inorganic composite wherein the silica ($SiO_2$) nano particle is modified by a chemical reaction is applied to the epoxy-based resin. The average particle size of the silica ($SiO_2$) of the organic/inorganic composite modified by the chemical reaction is 5-50 nm and, the solid of the nanoparticle in the organic/inorganic composite is 10 to 50%.

Also, the molecular weight of the epoxy-based resin contained in the organic/inorganic composite is 1,000 to 4,000, Tg (glass transition temperature) is 40 to 60° C., the ratio of the solid is 20 to 40% and the viscosity is 50 to 200 cp.

The method for manufacturing the insulating film composition of the non-oriented electrical steel sheet is characterized in that 0.1 to 1.0 wt % of the oxidizing promoter is mixed to the mixture of the mixed metal phosphate and organic/inorganic composite.

The problem such as the tacky due to a minor amount of free phosphoric acid remaining in the insulating film by the introduction of phosphate or, the adhesion upon annealing may be occurred. In order to solve this, the present invention found that sodium (Na) positive ion promotes the reaction between iron (Fe)-based oxide and the free phosphoric acid remaining in the coating solution, and applied sodium perborate ($NaBO_3 \cdot 4H_2O$). As the oxidizing promoter, sodium-based material can be used including sodium carbonate, and the like, in addition to sodium perborate.

Sodium perforate ($NaBO_3 \cdot 4H_2O$) is easily dissociated in the aqueous solution, it does not harm the surface characteristic including the corrosion resistance as well as not making any adverse effect on the solution stability, while upon adding to the insulating film composition.

Figure 3:
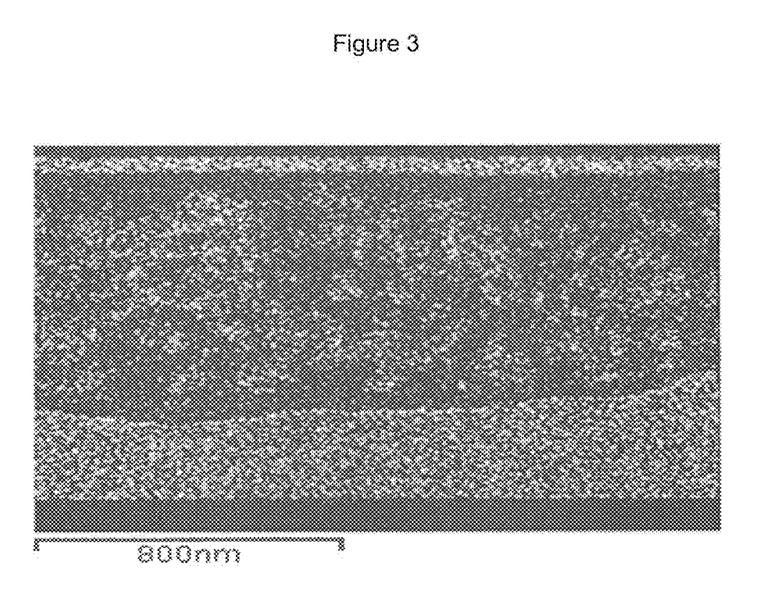
FIG. 3 is a drawing depicting that the sodium positive ion constituting an organic•inorganic composite material (composite) constituting the insulating film composition of the electrical steel sheet according to the present invention promotes the reaction of free phosphoric acid and iron oxide.

FIG. 3 is a drawing depicting that sodium perborate used as an oxidizing promoter is dissociated in the aqueous solution so that the sodium positive ion promotes the reaction between the free phosphoric acid and iron oxides.

Sodium (Na) positive ion dissociated from the aqueous solution as illustrated in FIG. 3, plays a role as the oxidizing promoter that induces the chemical bond of free phosphoric acids some of which are remained in the film layer with iron oxide at a high temperature (250° C. or more).

If the injecting amount of sodium perborate ($NaBO_3 \cdot 4H_2O$) is 0.1 g or less based on 100 g of the insulating film composition, the tacky and booming phenomenon in the surface were occurred despite of a high drying temperature, and if it is 1.0 g or more, the corrosion resistance and weatherability would be deteriorated.

It is characterized in that the aluminum phosphate is prepared by adding 5 to 40 g of aluminum hydroxide (Al(OH)$_3$) in 100 g of aqueous solution consisting of 15 wt % water ($H_2O$) and 85 wt % of phosphoric acid ($H_3PO_4$) and reacting them at the temperature range of 80 to 90° C. for 6 to 10 hrs.

It is characterized in that upon preparing the aluminum phosphate, aluminum and phosphorous form a single bond (Al—P), a double bond (Al═P) and a triple bond (Al≡P) by a chemical bond between aluminum hydroxide and phosphoric acid, wherein the amount of free phosphoric acid ($H_3PO_4$) may be less than 40%.

Meanwhile, it is characterized in that the cobalt phosphate is prepared by adding 2 to 5 g of cobalt hydroxide (Co(OH)$_2$) based on 100 g of aqueous solution consisting of 15 wt % water ($H_2O$) and 85 wt % of phosphoric acid ($H_3PO_4$) and reacting them at the temperature range of 80 to 90° C. for 6 to 10 hrs.

It is characterized in that the mixing ratio (aluminum phosphate/cobalt phosphate) of the aluminum phosphate and cobalt phosphate is 0.05 to 0.2.

It is characterized in that the solid content of the organic/inorganic composite is 30 to 70 wt %, and the ratio of silica ($SiO_2$)/resin in the solid is 0.3 to 0.6.

It is characterized in that the organic/inorganic composite is modified a silica ($SiO_2$) particle having the size of 10 to 50 nm to acid-based epoxy resin.

The non-oriented electrical steel sheet by another example of the present invention forms an insulating coating layer, and is characterized in that the insulating coating layer can be formed by applying an insulating film composition comprises a mixed metal phosphate consisting of aluminum phosphate (Al $(H_3PO_4)_{x=1-3}$) and cobalt phosphate (Co $(H_3PO_4)_3$), and an organic/inorganic composite consisting of epoxy resin and silica ($SiO_2$) nanoparticle substituted on the functional group of the epoxy resin to a surface of the electrical steel sheet, and then drying the insulation film composition.

The non-oriented electrical steel sheet is characterized in that the ratio of mineral in the insulating coating layer is 0.55 to 0.95.

It is characterized in that the distribution area of silica ($SiO_2$) distributed in the insulating coating layer is 5 to 30%.

In the present invention, if the coating solution composition which comprises the nanoparticle is applied to a specimen in a coating thickness of 0.5 to 1.0 μm per one side of the specimen, and then heat-treated at the temperature range of 300 to 750° C. for 10 to 30 seconds, the non-oriented electrical steel sheet having very excellent insulating property as well as having excellent corrosion resistance, weatherability, heat resistance and close contacting property before/after SRA being basic properties of the non-oriented electrical steel sheet, can be provided.

Hereinafter, the method for manufacturing the insulating film of the non-oriented electrical steel sheet according to the present invention is described in detail via exemplary embodiments. Provided that, the following exemplary embodiment is only to illustrate the present invention, but the contents of the present invention are not limited by the following exemplary embodiment.

<Example 1>

A high grade of non-oriented electrical steel sheet (150*50 mm) comprising 3.15 wt % of silicon (Si) based on the weight ratio and having 0.35 mm of sheet thickness was selected as a specimen, and thereon a solution prepared as represented in Table 1 was applied to each of prepared specimens by using bar coater and roll coater in a constant thickness (0.6 to 0.8 μm), and then maintained in the drying furnace at the temperature range of 300 to 750° C. for 10 to 30 seconds and then slowly cooled in the air.

Table 1 represented the solution stability depending on the injection amounts of aluminum hydroxide (Al(OH)$_3$) to 100 g of aqueous solution of 15 wt % water (H$_2$O) and 85 wt % of free phosphoric acid (H$_3$PO$_4$), and the amount of free phosphoric acid remained after the reaction, and the binding amount of the forms of aluminum(Al) and phosphorous (P) single (Al—P), double (Al═P) and triple (Al≡P).

As can be seen from Table 1, if the injection amount of aluminum hydroxide (Al(OH)$_3$) is 40 g or more, there was a problem that the solution stability is deteriorated. Wherein the solution stability was decided by the extent that aluminum hydroxide (Al(OH)$_3$) is precipitated when the solution is maintained under the atmospheric condition for 120 hours without any stirring. And, if the injection amount of aluminum hydroxide (Al(OH)$_3$) is 10 g or less, since the amount of free phosphoric acid after the reaction is high, there is a high possibility that the surface tacky and booming phenomenon are occurred due to a high amount of free phosphoric acid in the film composition.

Therefore, in the present invention, it is preferable to select the injection amount of aluminum hydroxide (Al(OH)$_3$) as 10 to 40 g. Particularly, the preferable case is that of 30 to 40 g which minimized the amount of free phosphoric acid after the reaction in view of excellent solution stability.

<Example 2>

Table 2 represented the solution stability, coating workability, surface condition, corrosion resistance and insulating property according to the ratios of mixed metal phosphate and silica (SiO$_2$) nano composite after setting the mixing ratio of cobalt phosphate/aluminum phosphate of cobalt phosphate (Co(H$_3$PO$_4$)$_3$) and aluminum phosphate (Al (H$_3$PO$_4$)$_{x=1-3}$) substituted 3 g of cobalt hydroxide (Co(OH)$_2$) and 30 g of aluminum hydroxide (Al(OH)$_3$), respectively, based on 100 g of free phosphoric acid, fixed to 1.0.

The particle size of silica nano composite used in the above is 10 nm and 30% of the solid of the silica was used. Solution stability and coating workability were very excellent in the range of 8:2 to 4:6 of the composite material and metal phosphate. Also in the surface condition, when the ratio of composite and metal phosphate is in the range of 8:2 to 3:7, very elegant surface without any defect could be obtained.

It was able to be seen that the corrosion resistance was very excellent when the ratio of the composite and metal phosphate is in the range of 7:3 to 4:6.

TABLE 1

The solution stability and close contacting property after SRA according to the kinds of metal phosphate

| | Free phosphoric acid before reaction (g) | Al (OH)$_3$ (g) | Solution stability | Binding ratio (%) | | | Free phosphoric acid after reaction (g) |
|---|---|---|---|---|---|---|---|
| | | | | Single | Double | Triple | |
| Experimental Example 1 | 100 | 5 | o | 7.4 | 5.8 | — | 86.8 |
| Experimental Example 2 | | 10 | o | 12.3 | 14.8 | — | 72.9 |
| Experimental Example 3 | | 20 | o | 15.2 | 20.6 | — | 64.2 |
| Experimental Example 4 | | 30 | o | 18.9 | 25.3 | 10.3 | 45.5 |
| Experimental Example 5 | | 40 | o | 16.2 | 28.7 | 15.4 | 39.7 |
| Experimental Example 6 | | 50 | x | 17.3 | 32.5 | 18.3 | 31.9 |

[physical property decision—no precipitation: o, small precipitation: Δ, large precipitation: x]

TABLE 2

Comparison results of solution stability, coating workability, surface condition, corrosion resistance and insulating property

| Division | Mixing ratio | | Solution stability | Coating workability | Surface | Insulating property | Corrosion resistance |
|---|---|---|---|---|---|---|---|
| | Composite material | Metal phosphate | | | | | |
| Invention Example 1 | 8 | 2 | ⊚ | ⊚ | ⊚ | Δ | ⊚ |
| Invention Example 2 | 7 | 3 | ⊚ | ⊚ | ⊚ | Δ | ⊚ |
| Invention Example 3 | 6 | 4 | ⊚ | ⊚ | ⊚ | ⊚ | ⊚ |
| Invention Example 4 | 5 | 5 | ⊚ | ⊚ | ⊚ | ⊚ | ⊚ |
| Invention Example 5 | 4 | 6 | ⊚ | ⊚ | ○ | ⊚ | ○ |
| Invention Example 6 | 3 | 7 | ○ | ⊚ | ○ | ○ | ○ |
| Invention Example 7 | 2 | 8 | Δ | Δ | Δ | ○ | Δ |

[physical property decision—very excellent 우수: ⊚, excellent: ○, normal: Δ, deteriorative: X]

<Example 3>

On the grounds of the results of the exemplary embodiments 1 and 2, the insulating and surface properties according to the compositional ratio of the silica particle and epoxy resin being the organic in the silica nano composite, the injection ratio of cobalt phosphate/aluminum phosphate when the ratio of the composite and metal phosphate is in the range of 6:4 to 5:5 are represented.

The particle size of the silica nano composite material used herein was 10 nm. The specific gravity of each film composition was set as 1:1 by using water, and the composition was applied in the coating thickness of 0.6 to 0.8 μmm with the bar coater No. 3, and subjected to the heat treatment at the temperature range of 500 to 750° C. for 10 to 30 seconds, and then, insulating and the surface property before/after SRA of the coating layer were compared. And the Comparative Examples 1 and 2 illustrated the surface properties of the chrome-based and chrome-free-based thin film products.

TABLE 3

Comparison of the insulating and surface properties according to the compositional ratio of the silica particle and epoxy resin being the organic in the silica nano composite, the injecting ratio of cobalt phosphate/aluminum phosphate

| Division | Metal phosphate MCoP/MAP | Injecting amount (Wt. %) | Injecting amount (Wt. %) | Compositional ratio | | Insulation (mA) | | Corrosion resistance | Close contacting | | Film hardness |
|---|---|---|---|---|---|---|---|---|---|---|---|
| | | | | Resin | $SiO_2$ | Before SRA | After SRA | | Before SRA | After SRA | |
| Invention Example 1 | 0.05 | 40 | 60 | 7 | 3 | 600 | 607 | ○ | ⊚ | ⊚ | ⊚ |
| Invention Example 2 | | | | 6 | 4 | 560 | 576 | ○ | ⊚ | ⊚ | ⊚ |
| Invention Example 3 | | | | 5 | 5 | 496 | 509 | ○ | ⊚ | ⊚ | ⊚ |
| Invention Example 4 | | | | 4 | 6 | 452 | 455 | ○ | ⊚ | ⊚ | ⊚ |
| Invention Example 5 | | 50 | 50 | 7 | 3 | 607 | 565 | ⊚ | ⊚ | ⊚ | ⊚ |
| Invention Example 6 | | | | 6 | 4 | 542 | 614 | ⊚ | ⊚ | ⊚ | ⊚ |
| Invention Example 7 | | | | 5 | 5 | 503 | 504 | ⊚ | ⊚ | ⊚ | ⊚ |
| Invention Example 8 | | | | 4 | 6 | 402 | 420 | ⊚ | ⊚ | ⊚ | ⊚ |
| Invention Example 9 | 0.1 | 40 | 60 | 7 | 3 | 622 | 628 | ○ | ⊚ | ⊚ | ⊚ |
| Invention Example 10 | | | | 6 | 4 | 577 | 565 | ○ | ⊚ | ⊚ | ⊚ |
| Invention Example 11 | | | | 5 | 5 | 536 | 555 | ○ | ⊚ | ⊚ | ⊚ |
| Invention Example 12 | | | | 4 | 6 | 509 | 588 | ○ | ⊚ | ⊚ | ⊚ |
| Invention Example 13 | | 50 | 50 | 7 | 3 | 616 | 638 | ⊚ | ⊚ | ⊚ | ⊚ |

TABLE 3-continued

Comparison of the insulating and surface properties according to the compositional ratio of the silica particle and epoxy resin being the organic in the silica nano composite, the injecting ratio of cobalt phosphate/aluminum phosphate

| Division | Metal phosphate MCoP/ MAP | Injecting amount (Wt. %) | Injecting amount (Wt. %) | Composite Compositional ratio Resin | Composite Compositional ratio SiO$_2$ | Insulation (mA) Before SRA | Insulation (mA) After SRA | Corrosion resistance | Close contacting Before SRA | Close contacting After SRA | Film hardness |
|---|---|---|---|---|---|---|---|---|---|---|---|
| Invention Example 14 | | | | 6 | 4 | 554 | 582 | ◎ | ◎ | ◎ | ◎ |
| Invention Example 15 | | | | 5 | 5 | 514 | 533 | ◎ | ◎ | ◎ | ◎ |
| Invention Example 16 | | | | 4 | 6 | 424 | 436 | ◎ | ◎ | ◎ | ◎ |
| Comparative Example 1 | Existing Cr-based coating product | | | | | 890 | 950 | ○ | ○ | ○ | ○ |
| Comparative Example 2 | Existing Cr-free coating product | | | | | 870 | 950 | ○ | ○ | ○ | ○ |

[physical property decision—very excellent: ◎, excellent: ○, normal: Δ, deteriorative: X]

The insulating property was measured by Franklin Insulation Tester, and this tester is an equipment for a veneer test method, which measures the surface insulating resistance of the electrical steel sheet under constant pressure and constant voltage.

The range of the current is 0 to 1.000 Amp, and the method for measuring insulation is that one sheet of specimen to be measured is placed on the plate so that a contact of electrode is contacted, and then pressure is applied by the pressuring apparatus to give 300 psi (20.4 atm). Upon reaching test pressure, a sliding resistor is adjusted and a scale of current system was read under a voltage of 0.5 V.

For each of test solutions, 10 insulating values were measured and the average thereof is represented. All of the invention examples illustrated very excellent insulating property compared to Comparative Examples 1 and 2.

The injecting ratio of cobalt phosphate/aluminum phosphate does not affect on the insulating property, provided that as the ratio of cobalt phosphate/aluminum phosphate is increased, the extent that the weterability of the coating composition is improved was somewhat improved.

If the ratio of the composite and metal phosphate is 5:5, the insulation property was somewhat excellent over that of 6:4, and as the ratio of SiO$_2$ substituted in the silica nano composite is increased, the insulating property was improved.

A corrosion resistance is that which evaluates as to whether any rust is generated on a specimen in 5%, 35° C., NaCl solution for 8 hours, and in the present test, it was indicated that if the area generating rust is 2% or lower, the resistance is very excellent; if the area is 5% or lower, the resistance is excellent; if the area is 20% or lower, the resistance is good; if the area is 30% or lower, the resistance is normal; and if the area is 50% or more, the resistance is bad.

Meanwhile, a close contacting property before SRA is that which is represented by a minimum circular arc diameter without any coat stripping when the tested specimen is bended at 180° in contact with the circular arc being 5, 10, 20, 30 to 100 mmf. Wherein, it was classified that if the minimum circular arc diameter is 5 mmφ or lower, the dose contacting property is very excellent; if it is 10 mmφ or lower, the close contacting property is excellent; and if it is 20 mmφ or lower, the close contacting property is normal.

Further, a close contacting property after SRA is that which quantizes the contamination extent of adhesive tape and the attachment or detachment of the film stripping part occurring when a constant size of the adhesive tape is attached and then detached after making a scratch on a surface by Cross Cut Tester after a heat treatment under a dry 100% nitrogen gas at 800° C. for 2 hours, and quantized (%) the contamination extent of adhesive tape and the attachment or detachment of the film stripping part occurring when a constant size of the adhesive tape is attached and then detached after making a scratch on a surface with 100 spaces in cross and longitudinal directions with 1 mm spacing by Cross Cut Tester.

For example, if the close contacting property after SRA is 0, it means that any film stripping part is not present on a surface of the film after SRA, and if the property is 100, it means that all of the tape areas are contaminated by the film stripping parts. Wherein it was expressed that if the area to be stripped is 0% or lower, the property is very excellent; if it is 5% or lower, the property is excellent; if it is 10% or lower, the property is normal; and if it is 20% or lower, the property is deteriorative.

The film hardness was measured by a semi-automatic type of a pencil hardness tester. The test was practiced by placing a core of pencil defined in KSG 2603 (pencil) against a drawing at about 45° angle, scratching the surface of the material with a load of about 1 kgf (9.8 N), and measuring the surface change of the material to measure the surface hardness (ASTM D2197). It was classified that if the pencil hardness is 9 H, the film hardness is very excellent; if it is 8 H, the coating hardness is excellent; if it is 6 to 7 H, the hardness is normal; and if it is 4 to 5 H, the hardness is very deteriorative.

<Example 4>

50 to 150 g and 0.1 to 1.0 g of the organic/inorganic composite material and sodium perborate (NaBO$_3$.4H$_2$O), respectively, were added per 100 g of the mixed metal phosphate of aluminum phosphate (Al(H$_3$PO$_4$)$_{x=1-3}$) and cobalt phosphate ((Co(H$_3$PO$_4$)$_3$), and sufficiently mixed with stirring them, and then applied in a thickness of 0.5 to 1.0 μm per each side of the specimen. When the insulation of the film applied with the composition was measured with Franklin insulation tester after heating the film at the temperature range of 350 to 750° C. for 10 to 30 seconds, an uniform distribution of nano particles in the coating layer, dense coating layer and elegant surface were formed and thus, the non-oriented electrical steel sheet having excellent insulating property could be obtained.

Figure 4:
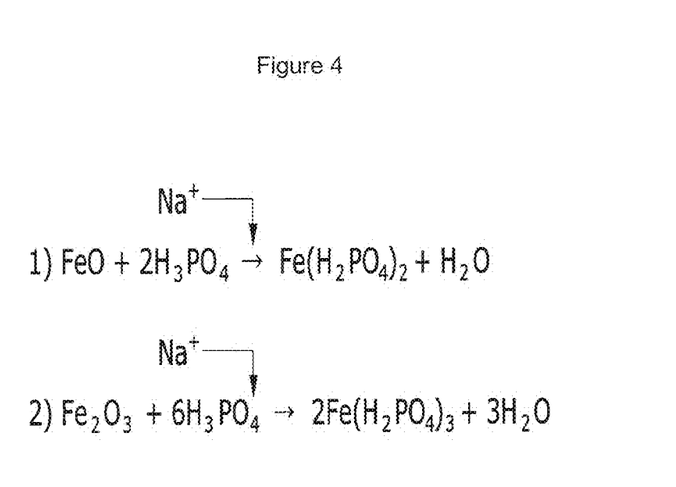
FIG. 4 is a drawing depicting the section of coating layer before stress relieving annealing of the electrical steel sheet dried after applying the insulating film composition according to the present invention to the surface.
Figure 5:
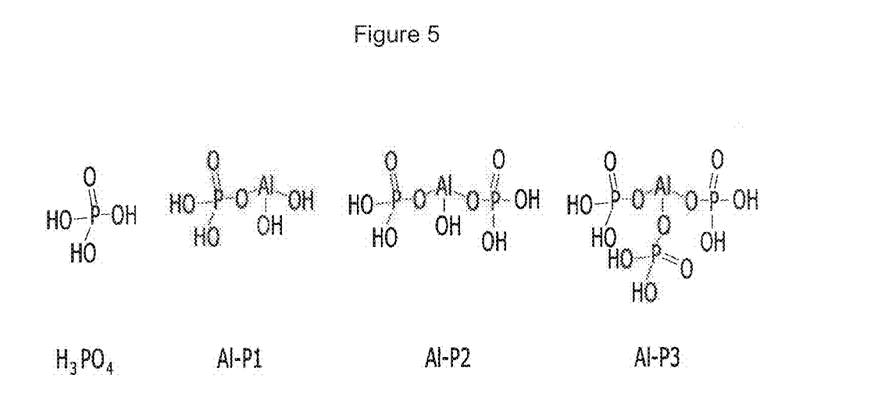
FIG. 5 is a drawing depicting the section of coating layer after SRA of the electrical steel sheet dried after applying the insulating film composition according to the present invention to the surface.

FIGS. 4 and 5 are photographs observed by scanning electron microscope (SEM) by processing the section of coating layer before and after SRA of the electrical steel sheet with FIB (Focused Ion Beam), respectively. As can be seen from the photographs, it can be seen that any porosity or cracking phenomenon in the coating layer was not occurred.

Also, there was almost no damage on the coating layer even after SRA process for 2 hours under nitrogen ($N_2$) 100% atmosphere at a temperature of 800° C.

Figure 6:
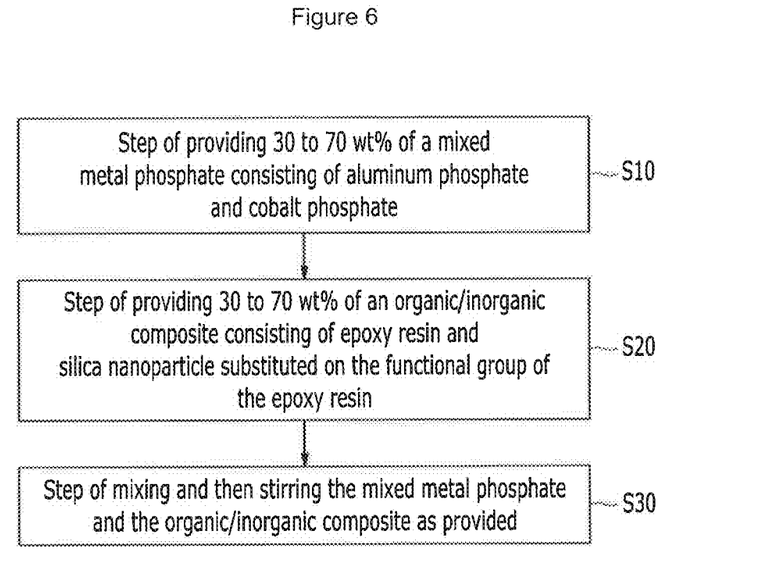
FIG. 6 is a drawing depicting the section of the coating layer (insulating film) to which the insulating film composition according to the present invention is applied.

FIG. 6 is a photograph that $SiO_2$ nanoparticle is distributed on the section of the coating layer and the section is processed with FIB process, and then TEM and EPMA are mapped. As can be seen from FIG. 6, it can be seen that $SiO_2$ nano particles in the coating layer are uniformly distributed on the surface of the coating layer, $SiO_2$ nanoparticles in the coating layer are uniformly distributed throughout the coating layer without any cohesion or aggregation phenomenon in the coating layer.

In FIG. 6, the silica nanoparticles distributed in the coating layer has an average particle size of 10 nm and the one illustrated as being bright (white) represents the nanoparticle.

Such an uniform distribution of the particles causes electrostatic Series Micro-Dielectric effect to improve the insulation resistance. Also, if the mineral nanoparticle is densely included in the coating layer, since this does not receive any effect due to the free volume reduction according to the pressure rise at the interface, in the case that a coating layer includes a porosity therein like existing coating layer, the phenomenon such as a free volume reduction is not occurred, and thus, this does not receive any insulating effect due to the free volume reduction.

Although exemplary embodiments of the present invention are illustrated in reference to accompanying drawings, those having ordinary knowledge in the art to which the present invention belongs could understand that the present invention can be practiced by other specific forms without changing any technical spirit or essential characteristics thereof.

Therefore, it must be understood that the exemplary embodiments as described above are exemplary in all aspects and not limitative. It should be understood that the range of the present invention is represented by the claims to be described below rather than the detailed description as above, and all the modifications or modified forms derived from the meaning and scope of the claims and the equivalent concepts thereof are included in the range of the present invention.

The invention claimed is:

1. An insulating film composition of a non-oriented electrical steel sheet, the composition comprising:
   a mixed metal phosphate consisting of aluminum phosphate and cobalt phosphate; and
   an organic/inorganic composite consisting of epoxy resin, wherein a functional group of the epoxy resin is substituted with silica ($SiO_2$) nanoparticles.

2. The insulating film composition of a non-oriented electrical steel sheet of claim 1, the composition comprising:
   30 to 70 wt % of the mixed metal phosphate, and 30 to 70 wt % of the organic/inorganic composite.

3. The insulating film composition of a non-oriented electrical steel sheet of claim 1, wherein:
   the insulating film composition further comprising an oxidizing promoter; and
   0.1 to 1.0 wt % of the oxidizing promoter is in the insulating film composition.

4. The insulating film composition of a non-oriented electrical steel sheet of claim 1, wherein:
   the size of the silica nanoparticles is 5 to 50 nm.

5. The insulating film composition of a non-oriented electrical steel sheet of claim 1, wherein:
   the mixing ratio of the aluminum phosphate and cobalt phosphate (aluminum phosphate/cobalt phosphate) mixed in the mixed metal phosphate is 0.05 to 0.2.

6. The insulating film composition of a non-oriented electrical steel sheet of claim 1, wherein:
   the solid content of the organic/inorganic composite is 30 to 70 wt %, and the ratio of the silica ($SiO_2$)/resin in the solid is 0.3 to 0.6.

7. The insulating film composition of a non-oriented electrical steel sheet of claim 3, wherein:
   the oxidizing promoter is sodium perborate ($NaBO_3.4H_2O$).

8. A method for manufacturing an insulating film composition of a non-oriented electrical steel sheet, the method comprising:
   providing 30 to 70 wt % of a mixed metal phosphate consisting of aluminum phosphate and cobalt phosphate;
   providing 30 to 70 wt % of an organic/inorganic composite consisting of epoxy resin, wherein a functional group of the epoxy resin is substituted with silica nanoparticles; and
   mixing and then stirring the mixed metal phosphate and the organic/inorganic composite as provided.

9. The method for manufacturing the insulating film composition of a non-oriented electrical steel sheet of claim 8, comprising:
   adding 0.1 to 1.0 wt % of oxidizing promoter to the mixture of the mixed metal phosphate and the organic/inorganic composite.

10. The method for manufacturing the insulating film composition of a non-oriented electrical steel sheet of claim 8, comprising:
    preparing the aluminum phosphate by adding 5 to 40 g of aluminum hydroxide ($Al(OH)_3$) based on 100 g of aqueous solution consisting of 15 wt % water ($H_2O$) and 85 wt % phosphoric acid ($H_3PO_4$) and reacting them at the temperature range of 80 to 90° C. for 6 to 10 hrs.

11. The method for manufacturing the insulating film composition of a non-oriented electrical steel sheet of claim 10, wherein:
    upon preparing the aluminum phosphate, aluminum and phosphorous form a single bond (Al—P), a double bond (Al═P) and a triple bond (Al≡P) by chemical bondings between aluminum hydroxide and phosphoric acid, wherein the amount of free phosphoric acid ($H_3PO_4$) is less than 40%.

12. The method for manufacturing the insulating film composition of a non-oriented electrical steel sheet of claim 8, wherein:
    preparing the cobalt phosphate by adding 2 to 5 g of cobalt hydroxide ($Co(OH)_2$) based on 100 g of aqueous solution consisting of 15 wt % water ($H_2O$) and 85 wt % of phosphoric acid ($H_3PO_4$) and reacting them at the temperature range of 80 to 90° C. for 6 to 10 hrs.

13. The method for manufacturing the insulating film composition of a non-oriented electrical steel sheet of claim 8, wherein:
    the mixing ratio of the aluminum phosphate and cobalt phosphate (aluminum phosphate/cobalt phosphate) is 0.05 to 0.2.

14. The method for manufacturing the insulating film composition of a non-oriented electrical steel sheet of claim 8, wherein:

the solid content of the organic/inorganic composite is 30 to 70 wt %, and the ratio of silica ($SiO_2$) resin in the solid is 0.3 to 0.6.

15. The method for manufacturing the insulating film composition of a non-oriented electrical steel sheet of claim 8, wherein:
the organic/inorganic composite is modified a silica ($SiO_2$) particle having the size of 10 to 50 nm to the acid-based epoxy resin.

16. A non-oriented electrical steel sheet on which an insulating coating layer is formed, wherein:
the insulating coating layer is formed by:
applying an insulating film composition to a surface of the electrical steel sheet, wherein the insulating composition comprises:
a mixed metal phosphate consisting of aluminum phosphate and cobalt phosphate; and
an organic/inorganic composite consisting of epoxy resin,
wherein a functional group of the epoxy resin is substituted with silica ($SiO_2$) nanoparticles; and
drying the insulation film composition.

17. The non-oriented electrical steel sheet of claim 16, wherein:
the insulating film composition includes 30 to 70 wt % of the mixed metal phosphate, and 30 to 70 wt % of the organic/inorganic composite.

18. The non-oriented electrical steel sheet of claim 17, wherein:
the insulating film composition further includes an oxidizing promoter; and
0.1 to 1.0 wt % of the oxidizing promoter is in the insulating film composition.

19. The non-oriented electrical steel sheet of claim 16, wherein:
the size of the silica nanoparticles is 5 to 50 nm.

20. The non-oriented electrical steel sheet of claim 16, wherein:
the mixing ratio of the aluminum phosphate and cobalt phosphate (aluminum phosphate/cobalt phosphate) mixed in the mixed metal phosphate is 0.05 to 0.2.

21. The non-oriented electrical steel sheet of claim 16, wherein:
the solid content of the organic/inorganic composite is 30 to 70 wt %, and the ratio of the silica ($SiO_2$)/resin in the solid is 0.3 to 0.6.

22. The non-oriented electrical steel sheet of claim 18, wherein:
the oxidizing promoter is sodium perforate ($NaBO_3 \cdot 4H_2O$).

23. The non-oriented electrical steel sheet of claim 16, wherein:
the ratio of the mineral in the insulating coating layer is 0.55-0.95.

24. The non-oriented electrical steel sheet of claim 16, wherein:
the distribution area of the silica ($SiO_2$) distributed in the insulating coating layer is 5 to 30%.

25. The non-oriented electrical steel sheet of claim 16, wherein:
the insulating resistance property at the coating layer thickness of 1.0 μm or lower is 10.0 $\Omega cm^2$ or more, and in the electrical steel sheet the coating layer is formed by the insulating film composition.

26. The non-oriented electrical steel sheet of claim 16, wherein:
after applying the insulating film composition, the loss of the coating layer is evener than prior to the application, in as stress relieving annealing (SRA) process at the temperature range of 700 to 850° C. and 100% nitrogen ($N_2$) atmosphere, and the insulating resistance property at 1.0 μm or lower is 10.0 $\Omega cm^2$ or more.

27. The non-oriented electrical steel sheet of claim 16, wherein:
in the electrical steel sheet that the coating layer is formed by the insulating film composition, the silica ($SiO_2$) nanoparticles are uniformly distributed in the coating layer.

* * * * *

UNITED STATES PATENT AND TRADEMARK OFFICE
CERTIFICATE OF CORRECTION

PATENT NO.        : 9,455,062 B2
APPLICATION NO.   : 14/369248
DATED             : September 27, 2016
INVENTOR(S)       : Jung-Woo Kim et al.

Page 1 of 1

It is certified that error appears in the above-identified patent and that said Letters Patent is hereby corrected as shown below:

In the Claims

In Claim 22, Column 18, Line 8, "sodium perforate" should read --sodium perborate--.

Signed and Sealed this
Ninth Day of May, 2017

Michelle K. Lee
*Director of the United States Patent and Trademark Office*